US008163249B2

(12) United States Patent
Chyou et al.

(10) Patent No.: US 8,163,249 B2
(45) Date of Patent: Apr. 24, 2012

(54) MULTIPLE-STAGE GRANULAR MOVING BED APPARATUS

(75) Inventors: Yau-Pin Chyou, Taipei (TW); Jiri Smid, Prague (CZ); Shu-San Hsiau, Taoyuan County (TW)

(73) Assignee: Institute of Nuclear Energy Research Atomic Energy Council, Executive Yuan, Taoyuan County (TW)

( * ) Notice: Subject to any disclaimer, the term of this patent is extended or adjusted under 35 U.S.C. 154(b) by 134 days.

(21) Appl. No.: 12/688,010

(22) Filed: Jan. 15, 2010

(65) Prior Publication Data

US 2010/0247393 A1    Sep. 30, 2010

(30) Foreign Application Priority Data

Mar. 25, 2009  (TW) .............................. 98109682 A

(51) Int. Cl.
  *B01D 50/00*  (2006.01)
  *B01J 8/08*  (2006.01)
(52) U.S. Cl. ........ 422/171; 422/160; 422/176; 422/216; 210/268; 34/171; 96/150
(58) Field of Classification Search .................. 422/216, 422/176, 171, 160; 210/268; 34/171; 96/150
See application file for complete search history.

(56) References Cited

U.S. PATENT DOCUMENTS

| | | | | |
|---|---|---|---|---|
| 3,926,593 A * | 12/1975 | Squires et al. ................. 95/276 |
| 3,982,326 A * | 9/1976 | Squires ........................... 34/443 |
| 4,004,350 A * | 1/1977 | Squires .......................... 34/506 |
| 4,233,268 A * | 11/1980 | Boret et al. .................... 422/619 |
| 4,349,362 A | 9/1982 | Tanaka et al. |
| 5,211,838 A * | 5/1993 | Staubs et al. .................... 208/65 |
| 5,332,562 A * | 7/1994 | Kersey et al. ................. 423/210 |
| 5,529,762 A * | 6/1996 | Alexander ............... 423/244.07 |
| 7,285,205 B2 * | 10/2007 | Sanchez et al. ................. 208/64 |
| 2004/0076556 A1 * | 4/2004 | Smid et al. .................... 422/171 |

FOREIGN PATENT DOCUMENTS

EP         0321914        6/1989

* cited by examiner

*Primary Examiner* — Walter D Griffin
*Assistant Examiner* — Huy-Tram Nguyen
(74) *Attorney, Agent, or Firm* — WPAT., P.C.; Justin King

(57) ABSTRACT

A multiple-stage granular moving-bed apparatus comprises a first integrated moving-bed unit, a second integrated moving-bed unit and at least one granular material. The first integrated moving-bed unit, having a first inlet part for providing a raw gas flowing therein, a first outlet part for providing a partially-cleaned gas flowing thereout, and a plurality of first flow-corrective elements disposed therebetween for defining two channels. The second integrated moving-bed unit, coupled to the first integrated moving-bed unit, having a second inlet part for providing the partially-cleaned gas flowing therein, a second outlet part for providing a completely-cleaned gas flowing thereout, and a plurality of second flow-corrective elements disposed therebetween for defining two channels. The at least one granular material flows through the two channels respectively and then passes through the two channels respectively.

23 Claims, 11 Drawing Sheets

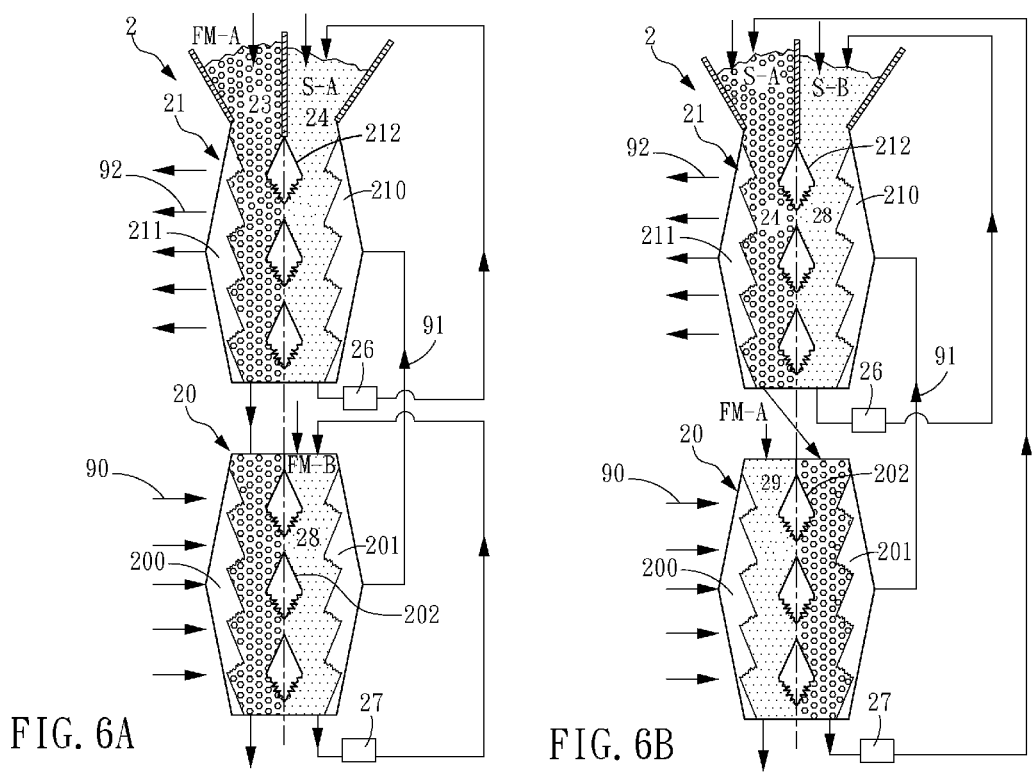

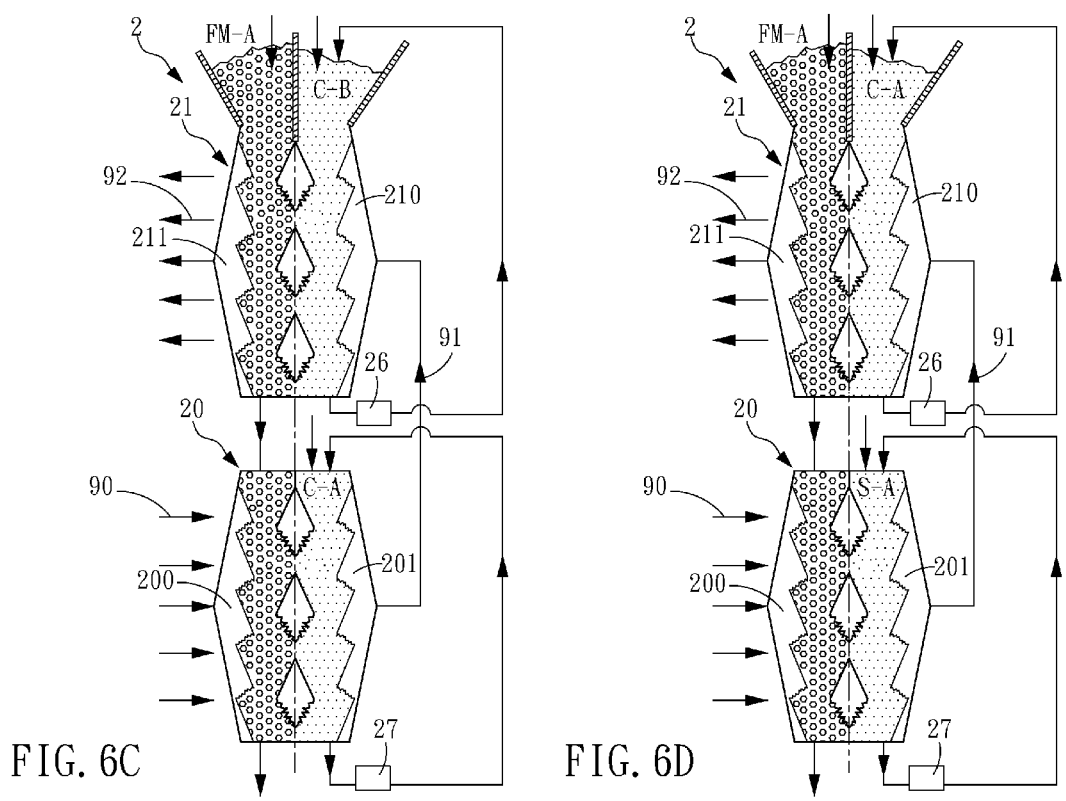

MULTIPLE-STAGE GRANULAR MOVING BED APPARATUS

FIELD OF THE INVENTION

The present invention relates to a granular moving-bed apparatus, and more particularly to a multiple-stage granular moving-bed filter capable of cleaning up a raw gas by forcing it to pass sequentially through a plurality of filtering units.

BACKGROUND OF THE INVENTION

Coal-fired power plants, or incineration plants generate high-temperature gas containing a large amount of fly ashes and dusts, sulfides, nitrides or other contaminants, and if the exhaust flue gas or raw syn-gas is emitted without processing, the environment of mankind will be affected seriously. In order to solve the environmental pollution problems due to hazardous gases, industrial countries have to constitute strict emission standards, and also input considerable research and development (R&D) resources to investigate how to remove the harmful pollutants in the gas streams effectively so as to conform to the emission standards.

In prior art, many methods of gas cleanup exist, among which some methods are common, namely mechanical separation of dust in cyclones, electrostatic dust collecting, baghouse filters, ceramic candle filters, granular moving-bed filters, etc. Cyclones are considered to be powerful and cheap pre-separators for gas cleanup purposes. Their removal efficiency is, however, limited to about 90% and rapidly deteriorates for particles smaller than 10 microns.

In the most widely used electrostatic dust precipitators, corona is utilized to ionize the exhaust gas so as to make the harmful materials carrying negative charges, and these materials are then caught on earthed collector plates to achieve the objective of gas cleanup. Electrostatic precipitators can be operated economically in flue gases of large volumes, but their efficiency is influenced by effects of chemical composition of particles, particle electric resistivity, moisture content, and temperature of gas.

Furthermore, another baghouse filter dust collecting technique also achieves the effect of gas cleanup through retaining the harmful materials in the exhaust gas, passing through the baghouse filter fabric. The baghouse filters offer very high dust collection efficiency and, operating in low temperature, they have the advantage over electrostatic dust precipitators, that the electric resistivity of dust particles does not play any role, making them competitive for high-resistivity ashes. Particles of different size are removed by different physical mechanisms in baghouse filters. The highest removal efficiencies are obtained for the large particles at high gas velocities and for the finest particles at low velocities. Baghouse filters can work at higher temperatures, depending on fabric materials. Ceramic materials, usually based on alumina, quartz or aluminum silicates are the best choice. A disadvantage when compared with electrostatic dust precipitators is the larger pressure drop and relatively low gas face velocity. Low gas face velocity gives rise to large filtration surface and inherently high costs.

Ceramic candle filters have been and are still being tested at full scale operation at several IGCC demonstration projects. Filter cleaning is done by backpulsing usually with nitrogen. Typical problems encountered during the testing are the breakage and strength degradation of ceramic candles owing to the overheating, thermal shocks and excessive pressure drop. In addition, the plenum vibration and back-pulse cleaning expose the candle filters to thermal and mechanical fatigue stresses that may ultimately lead to fracture of the filter elements.

Granular moving-bed filters are very well suitable for high temperature gas filtration. They are developed as key subsystems of current integrated gasification combined cycle (IGCC) and advanced pressurized fluidized bed combustion (PFBC) power generation systems. Their potential economic advantage is based on the fact that the granular moving-bed filters may be more compact than either electrostatic precipitators or baghouse filters. The principal disadvantage of these filters is that either a very thick bed or very fine granular material (or both) are required to give high removal efficiency of particulates in the 0.5 to 10 microns size range. The requirement for thick beds results in large expensive equipment, while the use of very fine granular material causes high pressure drop, poor bed flow characteristics, accompanied by stagnant zones and hot spots in granular moving bed, causing corrosion and plaques on louver wall. Flow patterns in moving bed are influenced by friction of filter media on louver walls. It results in uprise of stagnant zones alongside louver walls. Besides particulate removal, granular moving beds may be able to capture other contaminants through the use of other materials (such as sorbent, activated carbon, etc.), in two-stage process, but in one apparatus.

In order to improve the removal efficiency of granular moving-bed filters, and extend the options in which the granular filter media can be applied, the technologically developed countries are devoted to research and development of environmental-friendly gas cleanup technologies, and so far, the granular moving-bed filter is a highly regarded gas cleanup apparatus, and can be considered as the exhaust gas cleanup apparatus widely used in the future. FIG. 1 is a schematic view of a common granular moving-bed filter. Referring to FIG. 1, the granular moving-bed filter is constituted by a plurality of hopper-shaped structures 16, and each hopper-shaped structure 16 has louver walls 10 and 11 at two sides thereof. The granular material, serving as the filter medium, enters from the top of the granular moving bed, so that the granular material 15 goes down along the hopper-shaped structure 16 to clean up the harmful substances in the exhaust gas stream passing through the granular material, and the granular material which has adsorbed impurity or lost filtering effect exits from the bottom of the granular moving bed. In FIG. 1, the raw syn-gas or exhaust gas flow 90 enters the granular moving bed from the louver wall 10 at inlet side of the granular moving bed, and passes through the filter medium 15. The harmful or polluting material contained in the exhaust gas flow 90 is filtered out by the filter medium 15, and the clean gas flow 91 exits from the louver wall 11 at the outlet side of the granular moving bed.

In order to enhance the efficiency of process in conventional single-stage granular moving-bed apparatuses as the one shown in FIG. 1, a two-stage gas-solid moving-bed concept was evolved, wherein the depth of moving bed is divided between two stages, accommodated in two separate vertically mounted units (e.g. an absorption device shown in U.S. Pat. No. 4,349,362) or where single moving-bed filters (units) arranged horizontally act in series, such as a filter shown in FIG. 2 which is a device for the separation of dust from hot gases disclosed in EP 0321914. In the filter of FIG. 2, dust-laden hot gases are directed perpendicularly through vertically arranged bulk layers A, B, C in sequence so as to be purified by the filter materials contained in the three bulk layers A, B, C in a multiple-stage process.

SUMMARY OF THE INVENTION

The present invention provides a multiple-stage granular moving-bed apparatus, which utilizes a plurality of serially connected integrated moving-bed units for cleaning up a raw gas flow. As the raw gas is directed to flow from the bottom-most integrated moving-bed unit to the topmost one in the apparatus and passing through each and every integrated moving-bed units between the two in sequence, the raw gas is purified in a multiple-stage filtering process enabled by the multiple-stage granular moving-bed apparatus with satisfactory purification efficiency while occupied less space comparing with conventional moving-bed apparatuses.

The present invention provides a multiple-stage granular moving-bed apparatus, which not only is capable of utilizing a plurality of serially connected integrated moving-bed units for cleaning up a raw gas flow, but also is capable of utilizing a regeneration unit for regenerating and recycling a granular material used in the apparatus so as to maintain the gas-purification ability of the granular material and thus prolong the operational lifespan of the multiple-stage granular moving-bed apparatus.

In an exemplary embodiment of the invention, the present invention provides a multiple-stage granular moving-bed apparatus, comprising: a first integrated moving-bed unit, having a first inlet part for a raw gas to flow therein, a first outlet part for a partially-cleaned gas to flow thereout, and a plurality of first flow-corrective elements disposed in the first integrated moving-bed unit between the first inlet part and the first outlet part for defining two channels, each channel for individual stage of technological process; a second integrated moving-bed unit, coupled to the first integrated moving-bed unit, having a second inlet part for the partially-cleaned gas to flow therein, a second outlet part for a completely-cleaned gas to flow thereout, and a plurality of second flow-corrective elements disposed in the second integrated moving-bed unit between the second inlet part and the second outlet part for defining two channels, each channel for individual stage of technological process; and at least one granular material, flowing in the channels formed the first inlet part and the first outlet part between and the channels between the second inlet part and the second outlet part as well.

In another embodiment of the invention, the present invention provides a multiple-stage granular moving-bed apparatus, comprising: a first integrated moving-bed unit, having a first inlet part for a raw gas to flow therein, a first outlet part for a partially-cleaned gas to flow thereout, and a plurality of first flow-corrective elements disposed in the first integrated moving-bed unit between the first inlet part and the first outlet part for defining two channels, each channel for individual stage of technological process; a second integrated moving-bed unit, coupled to the first integrated moving-bed unit, having a second inlet part for the partially-cleaned gas to flow therein, a second outlet part for a completely-cleaned gas to flow thereout, and a plurality of second flow-corrective elements disposed in the second integrated moving-bed unit between the second inlet part and the second outlet part for defining two channels, each channel for individual stage of technological process; at least one granular material, flowing in the channels formed between the first inlet part and the first outlet part and in the channels between the second inlet part and the second outlet part as well; and a regeneration unit, for regenerating and recycling the at least one granular material.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein:

FIG. 6A is a schematic view of a multiple-stage granular moving-bed apparatus according to a fourth embodiment of the invention.

FIG. 6B to FIG. 6D are schematic diagrams showing respectively how various granular materials of different combinations are used in the multiple-stage granular moving-bed apparatuses of FIG. 6A.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
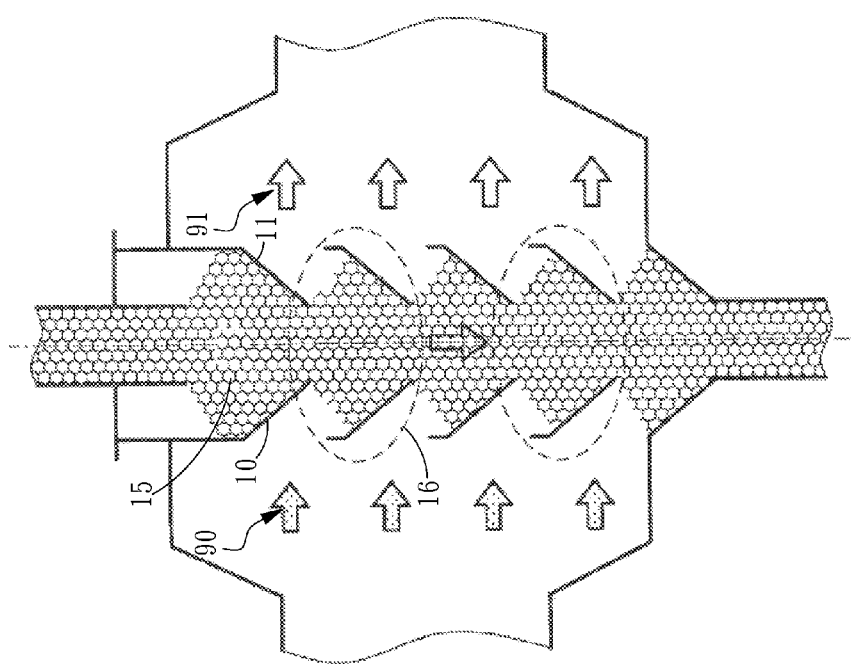
FIG. 1 is a schematic view of a conventional granular moving-bed apparatus.
Figure 2:
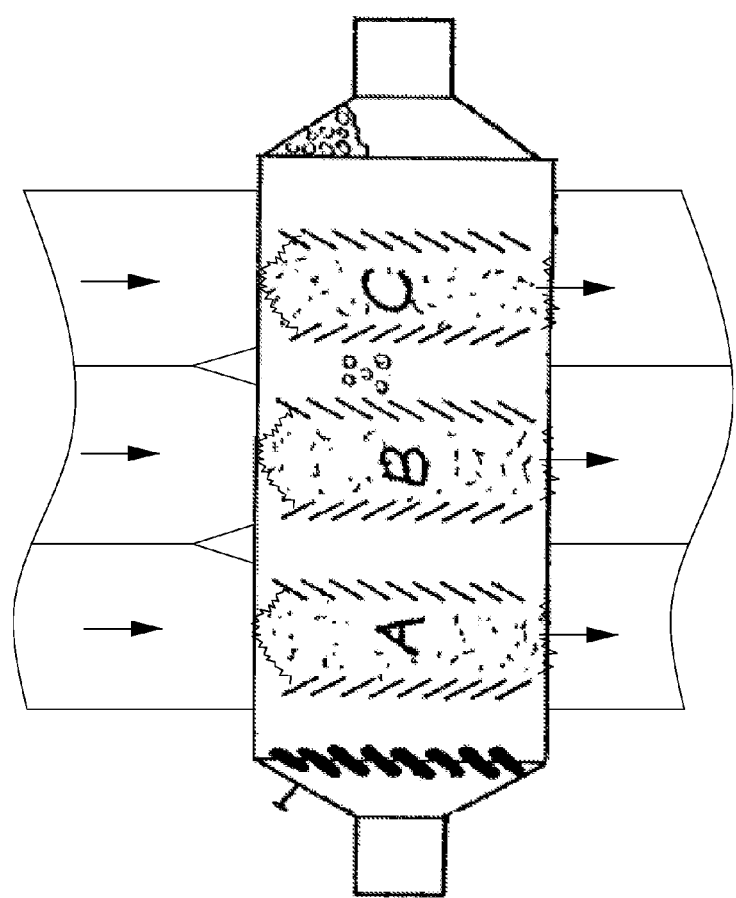
FIG. 2 is a schematic view of a device for the separation of dust from hot gases disclosed in EP 0321914.
Figure 3A:
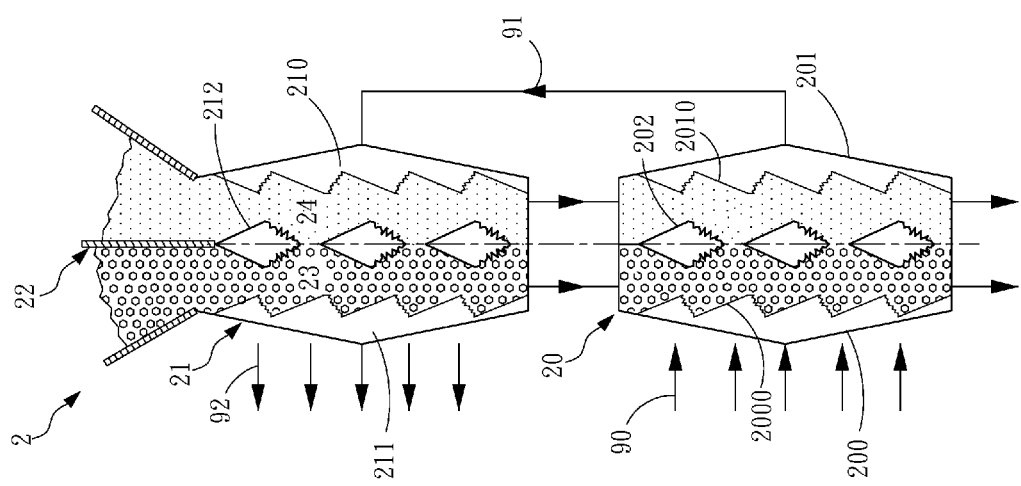
FIG. 3A is a schematic view of a multiple-stage granular moving-bed apparatus according to a first embodiment of the invention.
Figure 4A:
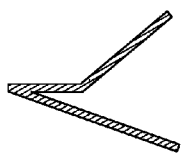
FIG. 4A to FIG. 4G are schematic diagrams showing various flow-corrective elements of different shapes.
Figure 4B:
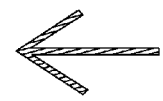
Figure 4C:
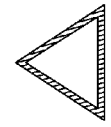
Figure 4D:
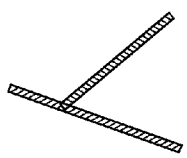
Figure 4E:
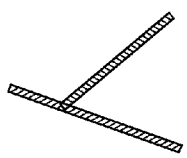
Figure 4F:
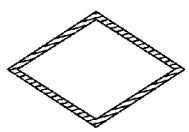
Figure 4G:
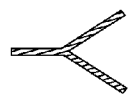

Please refer to FIG. 3A, which is a schematic view of a multiple-stage granular moving-bed apparatus according to a first embodiment of the invention. In this exemplary embodiment, the multiple-stage granular moving-bed apparatus 2 comprises: a first integrated moving-bed unit 20 and a second integrated moving-bed unit 21. The first integrated moving-bed unit 20 has an inlet part 200, an outlet part 201 and a plurality of flow-corrective elements 202, in which the inlet part 200 is configured with a first wall 2000 with a plurality of louvers, and the outlet part 201 is located at a side of the inlet part 200 and is configured with a second wall 2010 with a plurality of louvers disposed correspondingly to the first wall 2000 in respective. As for the plural flow-corrective elements 202, they are all being disposed between the inlet part 200 and the outlet part 201 for defining two channels in the first integrated moving-bed unit 20, each channel for individual stage of technological process. There are many kinds of flow-corrective elements 202 suitable for the present invention, as those shown in FIG. 4A to FIG. 4G. In FIG. 4A, the flow-corrective element is formed as a triangle-shaped element; in FIG. 4B, the flow-corrective element is formed as an arrow-shaped element; in FIG. 4C, the flow-corrective element is structured with two chute boards in a manner that the sides of the two chute boards are connected by a vertical plate; in FIG. 4D, the flow-corrective element is formed as a diamond-shaped element; in FIG. 4E, the flow-corrective element is formed as an inverse-V element composed of two chute boards; in FIG. 4F, the flow-corrective element is formed as an inverse-V structure having a protrusion extending from the tip of the inverse-V structure; and in FIG. 4G, the flow-corrective element is formed as an inverse-Y element. Since the flow-corrective element 202 is a part known to those skilled in the art, and thus will not be described further herein.

The second integrated moving-bed unit 21, being coupled to the first integrated moving-bed unit 20, is positioned above the first integrated moving-bed unit 20, which is also comprised of: an inlet part 210, an outlet part 211 and a plurality of flow-corrective elements 212. Moreover, the second integrated moving-bed unit 21 is further coupled to a filter material supply unit 22. The disposition of the inlet part 210, the outlet part 211 and the plural flow-corrective elements 212 in the second integrated moving-bed unit 21 is similar to the inlet part 220, the outlet part 201 and the flow-corrective elements 202 in the first integrated moving-bed unit 20, and thus will not be described further herein. Moreover, the channel formed between the inlet part 200 and the flow-corrective elements 202 of the first integrated moving-bed unit 20 is configured for enabling the same to communicate with the channel formed between the outlet part 211 and the flow-corrective elements 212 of the second integrated moving-bed unit 21, while the channel formed between the flow-corrective elements 202 and the outlet part 201 is configured for enabling the same to communicate with the channel formed between the flow-corrective elements 212 and the second inlet part 210 of the second integrated moving-bed unit 21. In addition, the filter material supply unit 22 that is coupled to the second integrated moving-bed unit 21 is being positioned above the second integrated moving-bed unit 21 for providing a first granular material 23 and a second granular material 24 to flow respectively into the channels defined inside the first and the second integrated moving-bed units 20, 21.

In this embodiment, the channel formed between the inlet part 200 and the flow-corrective elements 202 as well as that formed between the outlet part 211 and its corresponding flow-corrective elements 212 are provided for the first granular material 23 to flow therethrough; and on the other hand, the channel formed between the outlet part 201 and the flow-corrective elements 202 as well as that formed between the inlet part 210 and its corresponding flow-corrective elements 212 are provided for the second granular material 24 to flow therethrough. It is noted that flow of those granular materials 23, 24 in the integrated moving-bed units of the present invention can be controlled on the assumption that the flow properties of particulate solids and stresses in those channels are known. Thereby, the granular moving-bed apparatus with internal flow-corrective elements can be designed, where angles of the louvers of the first and the second walls 2000 and 2010 and sloping parts of flow-corrective elements, coefficients of wall friction and dimensions of spans between louvers of the first and second walls 2000 and 2010 and sloping parts of flow-corrective elements satisfy conditions for mass flow of the particulate solids, moving separately in two gravity flow systems. Under mass flow conditions, there will be no cross over between the boundary of two different granular materials.

Mass flow is a prerequisite since for the granular moving-bed apparatus applications such as a continuous filtration or adsorption process, it is not acceptable to has stagnant zones in integrated moving-bed units and a wide spread of particle residence time in moving bed. For the design of mass flow in the channels formed in the present invention, it is based upon a studies from Jenike, A. W., 1964, Storage and Flow of Solids. Bulletin No. 123, Utah Engng. Exp. Station, University of Utah, Salt Lake City, Utah, USA., which uses flow properties of particulate solids determined by shear testing. Under mass flow conditions, solutions describing stress and velocity field at vertex of the channel. That is, the stresses in the channel increase linearly with the distance from the vertex. Thus, stresses of moving bed on louver wall and sloping part of flow-corrective elements are proportional to the local width of convergent channel.

The multiple-stage granular moving-bed apparatus 2 of the invention is designed to filter a raw gas 90 by a sequence of multiple filtration, chemical reaction, or adsorption processing stages. In this first embodiment, the raw gas 90 containing dust and chemical pollutants, such as nitrous oxides, sulfur compounds, ammonia, alkalis, or hydrogen chloride, is introduced to the first integrated moving-bed unit 20 for a first and a second stages processing and subsequently to the second integrated moving-bed unit 21 for a third and forth stages processing. The raw gas 90 entering the first integrated moving-bed unit 20 from its inlet part 200 is going to flow passing the already partially-used granular materials 23, 24 so as to be filtered into a partially-cleaned gas 91, and then the partially-cleaned gas 91 is guided to flow into the second integrated moving-bed unit 21 from its inlet part 210 where it is going to flow passing fresh and clean granular materials 23, 24 and thus further being processed into a complete cleaned gas 92 to be discharged out of the apparatus from its outlet part 211. The first granular materials 23 or the second granular material 24 can be a filter medium, an adsorption medium or a catalyst medium that is capable of filtering dust, adsorbing chemical pollutants such as nitrous oxides, sulfur compounds, ammonia, alkalis, or hydrogen chloride. It is noted that the filter media capable of being used as the first or the second granular materials 23, 24 can be a kind of silica sand; and the adsorption medium can be activated carbon, but are not limited thereby. Moreover, the types of the first or the second granular materials 23, 24 being adopted in the present invention as well as their particle, or bulk properties can be determined according to actual requirements.

Figure 3B:
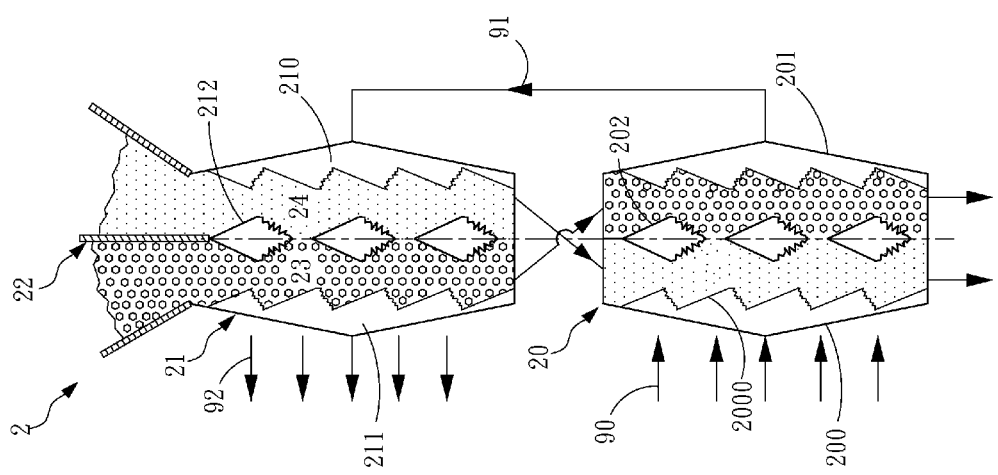
FIG. 3B is a schematic view of a multiple-stage granular moving-bed apparatus according to a second embodiment of the invention.

Please refer to FIG. 3B, which is a schematic view of a multiple-stage granular moving-bed apparatus according to a second embodiment of the invention. The apparatus shown in the second embodiment of FIG. 3B is basically the same as the one shown in the first embodiment, but is different in that: the apparatus of FIG. 3B is designed with alternating channels. That is, the channel formed between the inlet part 200 and the flow-corrective elements 202 in the first integrated moving-bed unit 20 is configured for enabling the same to communicate with the channel formed between the flow-corrective elements 212 and the inlet part 210 of the second integrated moving-bed unit 21, while the channel formed between the flow-corrective elements 202 and the outlet part 201 of the first integrated moving-bed unit 20 is configured for enabling the same to communicate with the channel formed between the outlet part 211 and the flow-corrective elements 212 of the second integrated moving-bed unit 21. In this embodiment, the types or the particle or bulk properties of the granular materials flowing in the first or the second integrated moving-bed units 20, 21 are determined according to different conditions of usage. Similarly, the raw gas 90 entering the first integrated moving-bed unit 20 is going to flow passing the already partially-used granular materials 23, 24 so as to be filtered into a partially-cleaned gas 91 to be discharged out of the first integrated moving-bed unit 20 from its outlet part 201, and then the partially-cleaned gas 91 is guided to flow into the second integrated moving-bed unit 21 from its inlet part 210 where it is going to flow passing fresh and clean granular materials 23, 24 and thus further being processed into a complete cleaned gas 92 to be discharged out of the apparatus from its outlet part 211.

Figure 3C:
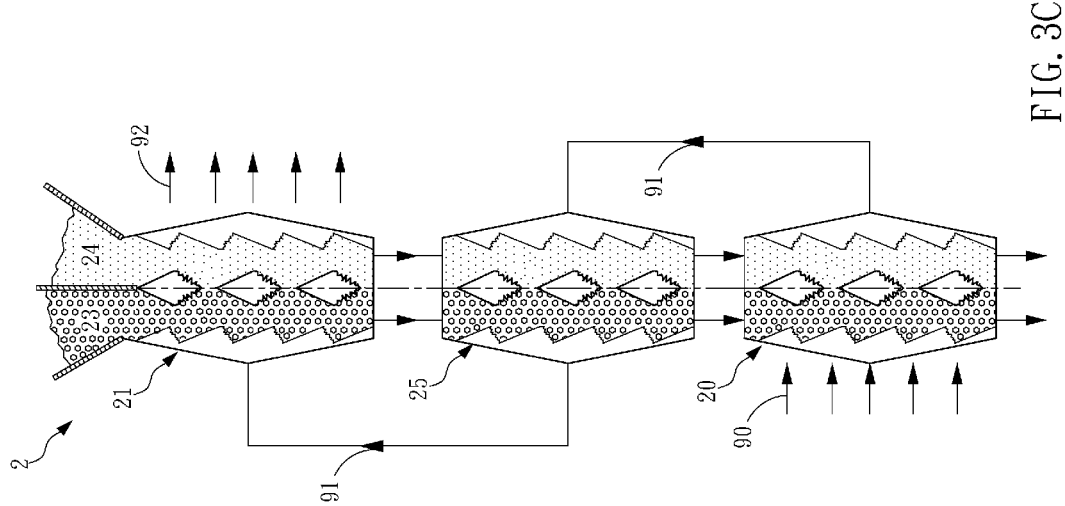
FIG. 3C is a schematic view of a multiple-stage granular moving-bed apparatus according to a third embodiment of the invention.
Figure 3D:
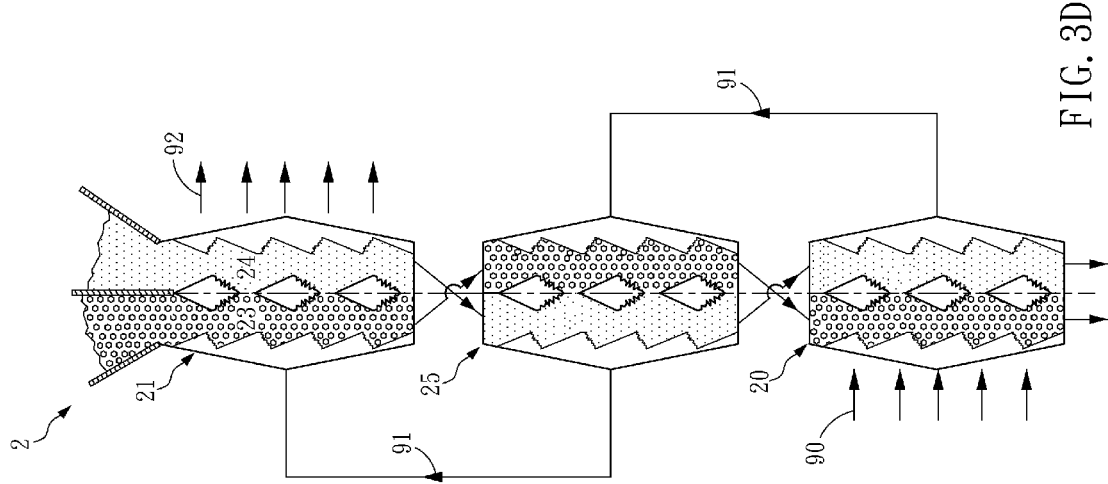
FIG. 3D is a variation of the multiple-stage granular moving-bed apparatus shown in a third embodiment of the invention

Please refer to FIG. 3C, which is a schematic view of a multiple-stage granular moving-bed apparatus according to a third embodiment of the invention. The difference between this embodiment and the prior two embodiments is that: there is an additional integrated moving-bed unit, referring as the third integrated moving-bed unit 25, being configured in the multiple-stage granular moving-bed apparatus at a position between the first and the second integrated moving-bed units 20, 21. Similarly, the multiple-stage granular moving-bed apparatus shown in FIG. 3D is the one with the additional third integrated moving-bed unit 25, but is different from the one shown in FIG. 3C in that: the apparatus of FIG. 3D is designed with alternating channels as the one shown in FIG. 3B. Thus, each of the multiple-stage granular moving-bed apparatus shown in FIG. 3C and FIG. 3D is actually a six-stage granular moving-bed apparatus. Operationally, the raw gas 90 is guided to flow from the bottommost first integrated moving-bed unit 20, through the third integrated moving-bed unit 25 disposed at the middle, and finally into the second integrated moving-bed unit 21 on the top. Thereby, dust or other chemical pollutants in the raw gas 90 can be cleaned in the six-stage processing provided by the aforesaid granular moving-bed apparatus.

Figure 5A:
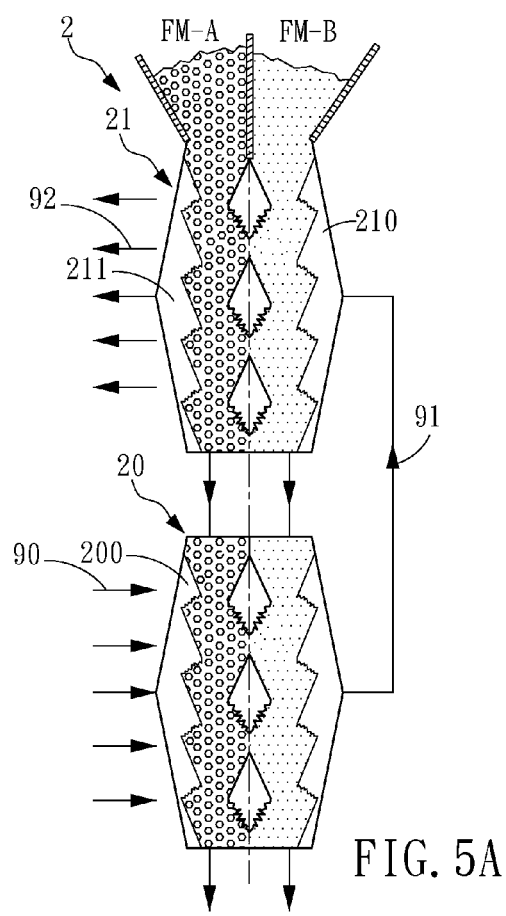
FIG. 5A to FIG. 5D are schematic diagrams showing respectively how various granular materials of different combinations are used in the multiple-stage granular moving-bed apparatuses of FIG. 3A or FIG. 3B.

Please refer to FIG. 5A to FIG. 5D, which are schematic diagrams showing respectively how various granular materials of different combinations are used in the multiple-stage granular moving-bed apparatuses of FIG. 3A or FIG. 3B. Generally, the granular materials, i.e. filter media, adsorption media or catalyst media, capable of being adopted in the multiple-stage granular moving-bed apparatuses of the invention may have different properties such as particle size, bulk density or flow properties in related to angle of internal friction, angle of wall friction, cohesion, and so on. In FIG. 5A, two different granular materials, i.e. FM-A and FM-B, are used and flowing inside the first and the second integrated moving-bed units 20, 21 for filtering dust and pollutants out of the raw gas 90. The first and second stages filtration are performed in the bottommost first integrated moving-bed unit 20, in which the raw gas 90 entering the first integrated moving-bed unit 20 through its inlet part 200 will engage with those already used FM-A particles flowing from the second integrated moving-bed unit 21, and then engage with other already used FM-B particles also flowing from the second integrated moving-bed unit 21 so as to be filtered thereby into a partially-cleaned gas 91.

Thereafter, the partially-cleaned gas 91 is being guided to enter the second integrated moving-bed unit 21 from its inlet part 210, in which the partially-cleaned gas 91 will first being cleaned by a fresh and clean FM-B granular material and then being guided to flow passing a fresh and clean FM-A granular material so as to form a completely-cleaned gas 92 to be discharged out of the apparatus from the outlet part 211. Accordingly, it is noted that the original raw gas that can be considered as the gas in it most dirty condition is contacted with the partially-used (not fresh) granular material in the unit of the first and second processing stages. Subsequently, the gas partially-cleaned by the partially-used (not fresh) granular material in the first integrated moving-bed unit is guided to the fresh granular material in the unit of the third and fourth processing stages, and thus, final filtration of gas is accomplished when gas flows through the fresh granular material and leaves the multiple-stage granular moving-bed apparatus as clean gas. Thereby, not only the cleaning efficiency of the multiple-stage granular moving-bed apparatus is greatly enhanced, but also the cleaning power of the granular material flowing in the multiple-stage granular moving-bed apparatus is fully exhausted.

Figure 5B:
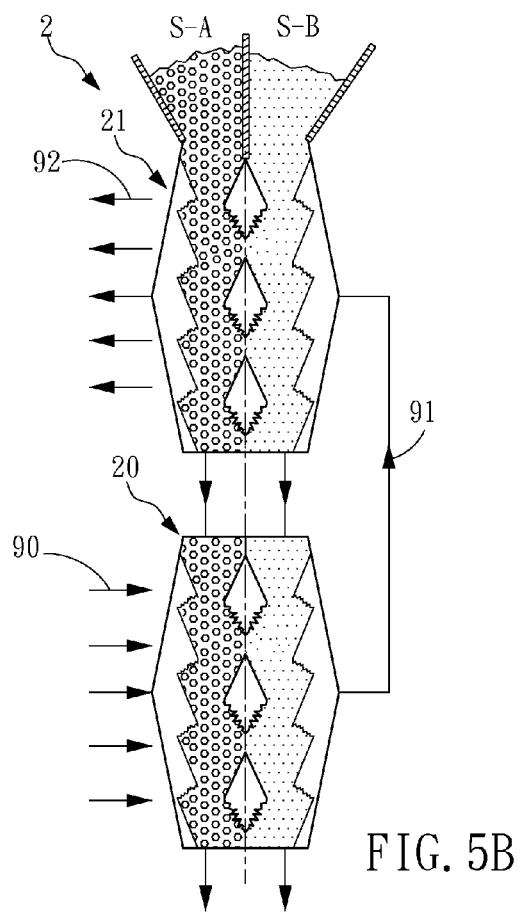
Figure 5C:
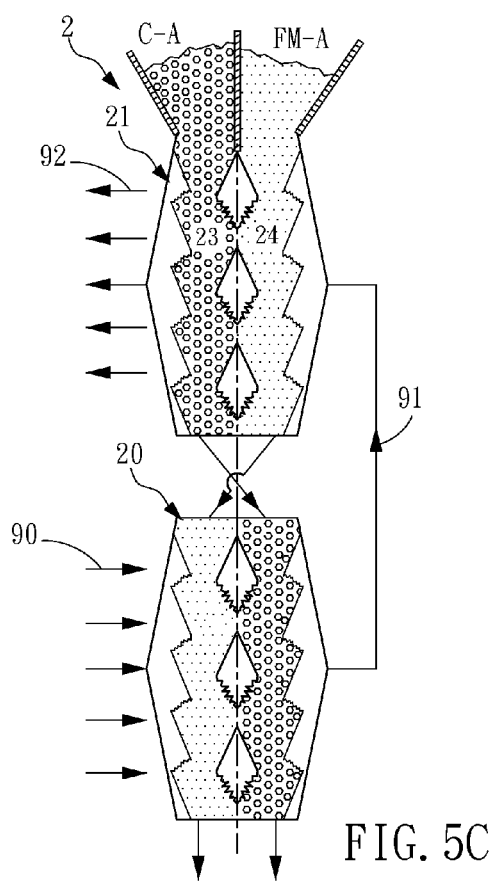
Figure 5D:
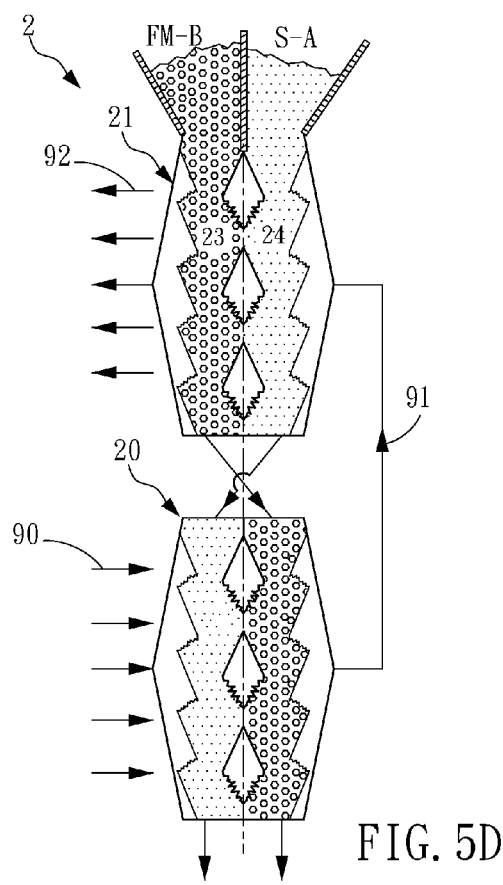

The cleaning processes shown in FIG. 5B and FIG. 5C are basically the same as the one shown in FIG. 5A, but are different in that: the granular materials used in FIG. 5B are adsorption media of S-A and S-B, which are used for removing dust and adsorbing chemical pollutants in the raw gas; and the granular materials used in FIG. 5C are catalyst media of C-A and FM-A, wherein FM-A is capable of filtering dust and pollutants out of the raw gas in the first and third stages while the catalyst media of C-A is capable of enhancing chemical reaction with pollutants and removing dust and pollutants out of the raw gas in the second and fourth stages. However, the combination of granular materials used in the embodiment of FIG. 5D is a combination of a filter medium and an adsorption medium, i.e. FM-B and S-A. Therefore, it is note that there can be unlimited amount of granular material combinations capable of being used in the multiple-stage granular moving-bed apparatuses of the invention and user can select any filter media, absorption media and catalyst media to be used in the granular material combination according to actual requirements.

Please refer to FIG. 6A, which is a schematic view of a multiple-stage granular moving-bed apparatus according to a fourth embodiment of the invention. The multiple-stage granular moving-bed apparatus shown in FIG. 6A is basically similar to those shown in previous embodiments, but is different in that: the multiple-stage granular moving-bed apparatus in FIG. 6A is further configured with a regeneration unit for regenerating and recycling those granular materials flowing in channels defined in the multiple-stage granular moving-bed apparatus. In this embodiment, the multiple-stage granular moving-bed apparatus comprises two regenerators 26, 27, which are designed for regenerating and recycling granular materials that are comparatively more expensive. However, for those granular materials that are not expensive, the regeneration unit is not a necessity for the multiple-stage granular moving-bed apparatus. As for the granular materials used in this embodiment, the granular material 23 can be the FM-A filter medium which is a cheap material; the granular material 24 is the S-A absorption medium which is considered to be an expensive material; and the granular material 28 is the FM-B filter medium which is also considered to be an expensive material.

In FIG. 6A, the regenerator 26 is connected to the bottom of the channel formed in the second integrated moving-bed unit 21 between the inlet part 210 and the flow-corrective elements 212 so that it is used for performing a regeneration/recycle process upon the granular material 24 flowing therein. Since it is possible for the granular material 24 to lose during the regeneration/recycle process, a supply of fresh granular material 24 can be placed above the second integrated moving-bed unit 21 for replenish the same into the channel. Moreover, the regenerator 27 is connected to the bottom discharge of the granular media 28 in the first integrated moving bed 20 so that it is used for performing a regeneration/recycle process upon the granular material 28 flowing therein. Thereby, the raw gas 90 flowing in the first integrated moving-bed unit 20 will first be filtered ($1^{st}$ stage) by the partially-used granular material 23 from the second integrated moving-bed unit 21. As the granular material 23 used in this embodiment is a comparatively cheaper material, it is not recycled. After being filtered by the partially-used granular material 23, the flow of the raw gas 90 will be filtered by the granular material 28 ($2^{nd}$ stage) so as to form a partially-cleaned gas 91. As the granular material 28 used in this embodiment is a comparatively expensive material, it is recycled and regenerated by the regenerator 27. The regenerator 27, being disposed at a position outside the first integrated moving-bed unit 20, is connected to the channel having the granular material 28 flowing therein through a recycle circuit, by that the downward flowing granular material 28 after being regenerated by the regenerator 27 can be driven to flow upward and thus back into the channel. Moreover, since it is possible for the granular material 28 to lose during the regeneration/recycle process of the regenerator 27, a supply of fresh granular material 28 can be placed above the first integrated moving-bed unit 20 for replenish the same into the channel.

Thereafter, the partially-cleaned gas 91 will be guided to flow into the second integrated moving-bed unit 21 through its inlet part 210 for enabling the gas 91 to flow passing through the granular material 24 ($3^{rd}$ stage). It is noted that the granular material 24 used in this embodiment is an expensive material so that it is required to be regenerated by the regenerator 26. After being cleaned by the granular material 24, the gas 91 will flow passing the fresh granular material 23 ($4^{th}$ stage) so as to form a completely-cleaned gas 92 to be discharged out of the apparatus form the outlet part 211. The embodiment shown in FIG. 6B is basically the same as the one shown in FIG. 6A, but is different in that: the channel formed in the second integrated moving-bed unit 21 between the outlet part 211 and the flow-corrective elements 212 is connected to the channel formed in the first integrated moving-bed unit 20 between the outlet part 201 and the flow-corrective elements 202, by that the channel in the first integrated moving-bed unit 20 between the inlet part 200 and the flow-corrective elements 202 can be independent from other channels to be provided for a comparatively cheaper granular material 29 to flow therein. As for the regenerators 26, 27 in FIG. 6B, they are used for regenerating and recycling the more expensive granular materials 24, 28. In this embodiment, the granular materials 24, 28 are adsorption media. In addition, since it is possible for the granular materials 24, 28 to lose during the regeneration/recycle process of the regenerators 26, 27, supplies of fresh granular materials 24, 28 can be placed above the second integrated moving-bed unit 20 for replenish the same into the channels. Please refer to FIG. 6C and FIG. 6D, which are schematic diagrams showing respectively how various granular materials of different combinations are used in the multiple-stage granular moving-bed apparatuses of FIG. 6A. In FIG. 6C, the combination of a cheap FM-A filter medium and two comparatively more expensive C-A and C-B catalyst media is used. In FIG. 6D, the combination of a FM-A filter medium a C-A catalyst medium and a S-A absorption medium is used. Moreover, the amount of regenerators used in the apparatus of the invention is dependent upon actual requirements and thus is not limited by the aforesaid embodiments. In addition, since it is possible for the granular materials to lose during the regeneration/recycle process of the regenerators 26, 27, supplies of fresh granular materials are required to be placed above the first and the second integrated moving-bed units 20, 21 for replenish the same into the channels.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A multiple-stage granular moving-bed apparatus, comprising:
   a first integrated moving-bed unit, having a first inlet part for a raw gas to flow therein, a first outlet part for a partially-cleaned gas to flow thereout, and a plurality of first flow-corrective elements disposed in the first integrated moving-bed unit between the first inlet part and the first outlet part for defining two first channels, each first channel for individual stage of technological process;
   a second integrated moving-bed unit, disposed above the first integrated moving-bed unit, having a second inlet part for the partially-cleaned gas to flow therein, a second outlet part for a completely-cleaned gas to flow thereout, and a plurality of second flow-corrective elements disposed in the second integrated moving-bed unit between the second inlet part and the second outlet part for defining two second channels, each second channel for individual stage of technological process, and at least one second channel is communication with the at least one first channel; and
   at least one fresh and clean granular material, flowing from at least one of the second channels for reacting with the partially-cleaned gas so that the fresh and clean granular material is formed to be a partially-used granular material, and the partially-used granular material further flow through at least one of the first channels,
   wherein the raw as entering the first integrated moving-bed unit from the first inlet part and passing the partially-used granular materials so as to be filtered into the partially-cleaned gas, and then the partially-cleaned gas being guided to flow into the second integrated moving-bed unit from the second inlet part and passing fresh and clean granular materials and thus further being processed into the complete cleaned gas to be discharged out from the second outlet part.

2. The apparatus of claim 1, wherein the channel formed between the first inlet part and the first flow-corrective elements is configured for enabling the same to communicate with the channel formed between the second flow-corrective elements and the second outlet part, while the channel formed between the first flow-corrective elements and the first outlet part is configured for enabling the same to communicate with the channel formed between the second inlet part and the second flow-corrective elements.

3. The apparatus of claim 1, wherein the channel formed between the first inlet part and the first flow-corrective elements is configured for enabling the same to communicate with the channel formed between the second inlet part and the second flow-corrective elements, while the channel formed between the first flow-corrective elements and the first outlet part is configured for enabling the same to communicate with the channel formed between the second flow-corrective elements and the second outlet part.

4. The apparatus of claim 1, wherein the at least one granular material is a filter medium.

5. The apparatus of claim 1, wherein the at least one granular material is an adsorbing medium.

6. The apparatus of claim 1, wherein the at least one granular material is a catalyst medium.

7. The apparatus of claim 1, further comprising:
a third integrated moving bed unit, disposed at a position between the first and the second integrated moving-bed units.

8. The apparatus of claim 1, wherein each of the first and the second flow-corrective element is structured and formed in a shape selected from a group consisting of: triangle, arrow, diamond, inverse-V, and inverse-Y.

9. The apparatus of claim 1, wherein each of the first and the second flow-corrective element is structured with two chute boards in a manner that the sides of the two chute boards are connected by a vertical plate.

10. The apparatus of claim 1, wherein each of the first and the second flow-corrective element is and formed as an inverse-V structure having a protrusion extending from the tip of the inverse-V structure.

11. A multiple-stage granular moving-bed apparatus, comprising:
a first integrated moving-bed unit, having a first inlet part for a raw gas to flow therein, a first outlet part for a partially-cleaned gas to flow thereout, and a plurality of first flow-corrective elements disposed in the first integrated moving-bed unit between the first inlet part and the first outlet part for defining two first channels, each first channel for individual stage of technological process;
a second integrated moving-bed unit, disposed above the first integrated moving-bed unit, having a second inlet part for the partially-cleaned gas to flow therein, a second outlet part for a completely-cleaned gas to flow thereout, and a plurality of second flow-corrective elements disposed in the second integrated moving-bed unit between the second inlet part and the second outlet part for defining two second channels, each second channel for individual stage of technological process, and at least one second channel is communication with the at least one first channel;
at least one fresh and clean granular material, flowing from at least one of the second channels for reacting with the partially-cleaned gas so that the fresh and clean granular material is formed to be a partially-used granular material, and the partially-used granular material further flow through at least one of the first channels; and
a regeneration unit, for regenerating and recycling the at least one granular material;
wherein a raw gas entering the first integrated moving-bed unit from the first inlet part and passing the already partially-used granular materials so as to be filtered into a partially-cleaned gas, and then the partially-cleaned gas being guided to flow into the second integrated moving-bed unit from the second inlet part and passing fresh and clean granular materials and thus further being processed into a complete cleaned gas to be discharged out from the second outlet part.

12. The apparatus of claim 11, wherein the channel formed between the first inlet part and the first flow-corrective elements is configured for enabling the same to communicate with the channel formed between the second flow-corrective elements and the second outlet part, while the channel formed between the first flow-corrective elements and the first outlet part is configured for enabling the same to communicate with the channel formed between the second inlet part and the second flow-corrective elements.

13. The apparatus of claim 11, wherein the channel formed between the first inlet part and the first flow-corrective elements is configured for enabling the same to communicate with the channel formed between the second inlet part and the second flow-corrective elements, while the channel formed between the first flow-corrective elements and the first outlet part is configured for enabling the same to communicate with the channel formed between the second flow-corrective elements and the second outlet part.

14. The apparatus of claim 11, wherein the channel formed between the first inlet part and the first flow-corrective elements is configured for enabling the same to communicate with the channel formed between the second inlet part and the second flow-corrective elements, while the regeneration unit is further comprised of: a first regenerator, disposed for enabling the same to communicate with the channel formed between the first flow-corrective elements and the first outlet part; and a second regenerator, disposed for enabling the same to communicate with the channel formed between the second flow-corrective elements and the second outlet part.

15. The apparatus of claim 11, wherein the channel formed between the first inlet part and the first flow-corrective elements is configured for enabling the same to communicate with the channel formed between the second flow-corrective elements and the second outlet part, while the regeneration unit is further comprised of: a first regenerator, disposed for enabling the same to communicate with the channel formed between the first flow-corrective elements and the first outlet part; and a second regenerator, disposed for enabling the same to communicate with the channel formed between the second flow-corrective elements and the second inlet part.

16. The apparatus of claim 11, wherein the channel formed between the first outlet part and the first flow-corrective elements is configured for enabling the same to communicate with the channel formed between the second outlet part and the second flow-corrective elements, while the regeneration unit is further comprised of: a first regenerator, disposed for enabling the same to communicate with the channel formed between the first flow-corrective elements and the first outlet part; and a second regenerator, disposed for enabling the same to communicate with the channel formed between the second flow-corrective elements and the second inlet part.

17. The apparatus of claim 11, wherein the at least one granular material is a filter medium.

18. The apparatus of claim 11, wherein the at least one granular material is an adsorbing medium.

19. The apparatus of claim 11, wherein the at least one granular material is a catalyst medium.

20. The apparatus of claim 11, further comprising:
a third integrated moving-bed unit, disposed at a position between the first and the second integrated moving-bed units.

21. The apparatus of claim 11, wherein each of the first and the second flow-corrective element is structured and formed in a shaped selected from a group consisting of: triangle, arrow, diamond, inverse-V, and inverse-Y.

22. The apparatus of claim 11, wherein each of the first and the second flow-corrective element is structured with two chute boards in a manner that the sides of the two chute boards are connected by a vertical plate.

23. The apparatus of claim 11, wherein each of the first and the second flow-corrective element is and formed as an inverse-V structure having a protrusion extending from the tip of the inverse-V structure.

* * * * *